(12) United States Patent
Bonyadi et al.

(10) Patent No.: US 12,453,942 B2
(45) Date of Patent: Oct. 28, 2025

(54) POROUS POLY (CYCLIC OLEFIN) MEMBRANES

(71) Applicants: ENTEGRIS, INC., Billerica, MA (US); PROMERUS, LLC, Akron, OH (US)

(72) Inventors: Sina Bonyadi, Billerica, MA (US); Pushkara Rao Varanasi, Poughkeepsie, NY (US); Zhifeng Li, Acton, MA (US); Carrie Lynn Frazee, Bedford, MA (US); Larry F. Rhodes, Akron, OH (US); Leah Langsdorf, Akron, OH (US)

(73) Assignees: ENTEGRIS, INC., Billerica, MA (US); PROMERUS, LLC, Akron, OH (US)

( * ) Notice: Subject to any disclaimer, the term of this patent is extended or adjusted under 35 U.S.C. 154(b) by 0 days.

(21) Appl. No.: 17/738,518

(22) Filed: May 6, 2022

(65) Prior Publication Data
US 2022/0362720 A1  Nov. 17, 2022

Related U.S. Application Data

(60) Provisional application No. 63/185,855, filed on May 7, 2021.

(51) Int. Cl.
| | |
|---|---|
| *B01D 71/44* | (2006.01) |
| *B01D 67/00* | (2006.01) |
| *B01D 69/02* | (2006.01) |

(52) U.S. Cl.
CPC ......... *B01D 71/44* (2013.01); *B01D 67/0013* (2013.01); *B01D 69/02* (2013.01); *B01D 2325/02* (2013.01); *B01D 2325/04* (2013.01)

(58) Field of Classification Search
None
See application file for complete search history.

(56) References Cited

U.S. PATENT DOCUMENTS

| | | | |
|---|---|---|---|
| 6,126,825 A | 10/2000 | Shinagawa | |
| 8,470,944 B2 | 6/2013 | Knapp | |
| 9,926,662 B2 | 3/2018 | Shimada | |
| 10,245,562 B2 | 4/2019 | Bell | |
| 10,792,620 B2 | 10/2020 | Jaber et al. | |
| 2011/0178260 A1 | 7/2011 | Peng | |
| 2012/0283404 A1* | 11/2012 | Knapp | B01D 69/02 |
| | | | 526/242 |
| 2015/0343395 A1 | 12/2015 | Abdel-Hakim et al. | |
| 2017/0015790 A1* | 1/2017 | Bell | B01D 71/44 |
| 2018/0185835 A1 | 7/2018 | Jaber et al. | |
| 2019/0329185 A1 | 10/2019 | Jaber et al. | |
| 2020/0157423 A1 | 5/2020 | Bilodeau | |
| 2020/0206691 A1 | 7/2020 | Jaber et al. | |
| 2020/0254398 A1 | 8/2020 | Hamzik et al. | |
| 2020/0406201 A1 | 12/2020 | Choi et al. | |
| 2021/0013034 A1 | 1/2021 | Wu | |

FOREIGN PATENT DOCUMENTS

| | | |
|---|---|---|
| CN | 2408948 Y | 12/2000 |
| GB | 2322330 B | 10/1998 |
| JP | 5348975 A | 11/1978 |
| JP | 11165051 A | 6/1999 |
| JP | 2000107578 A | 4/2000 |
| JP | 2011012113 A | 1/2011 |

OTHER PUBLICATIONS

Tetsuka et al. "Addition-type poly(norbornene)s with siloxane substituents: synthesis, properties and nanoporous membrane" (Polymer Journal, 2011, 43, 97-100). (Year: 2011).*
Kahrs, C. et al., Journal of Applied Polymer Science, 2020, vol. 137, No. 28, Article No. 48852 (internal pp. 1-19).
Sabzekar, M. et al., Journal of membrane science, 2021 [E-pub.: Nov. 3, 2020], vol. 621, Article No. 118845 (internal pp. 1-16).
Bartosz Tylkowski, et al., Overview of Main Techniques Used for Membrane Characterization, Journal of Chemical Technology and Metallurgy, 50, 1, 2015, 3-12.

* cited by examiner

*Primary Examiner* — Ryan B Huang

(57) ABSTRACT

The disclosure provides certain porous membranes comprised of cyclic polyolefin polymers, such as poly(norbornene)s. In one embodiment, a poly(norbornene) polymer is dissolved in tetrahydrofuran, cast into a film and subjected to solvent induced phase separation to provide a porous filter membrane (i.e., film).

12 Claims, 1 Drawing Sheet

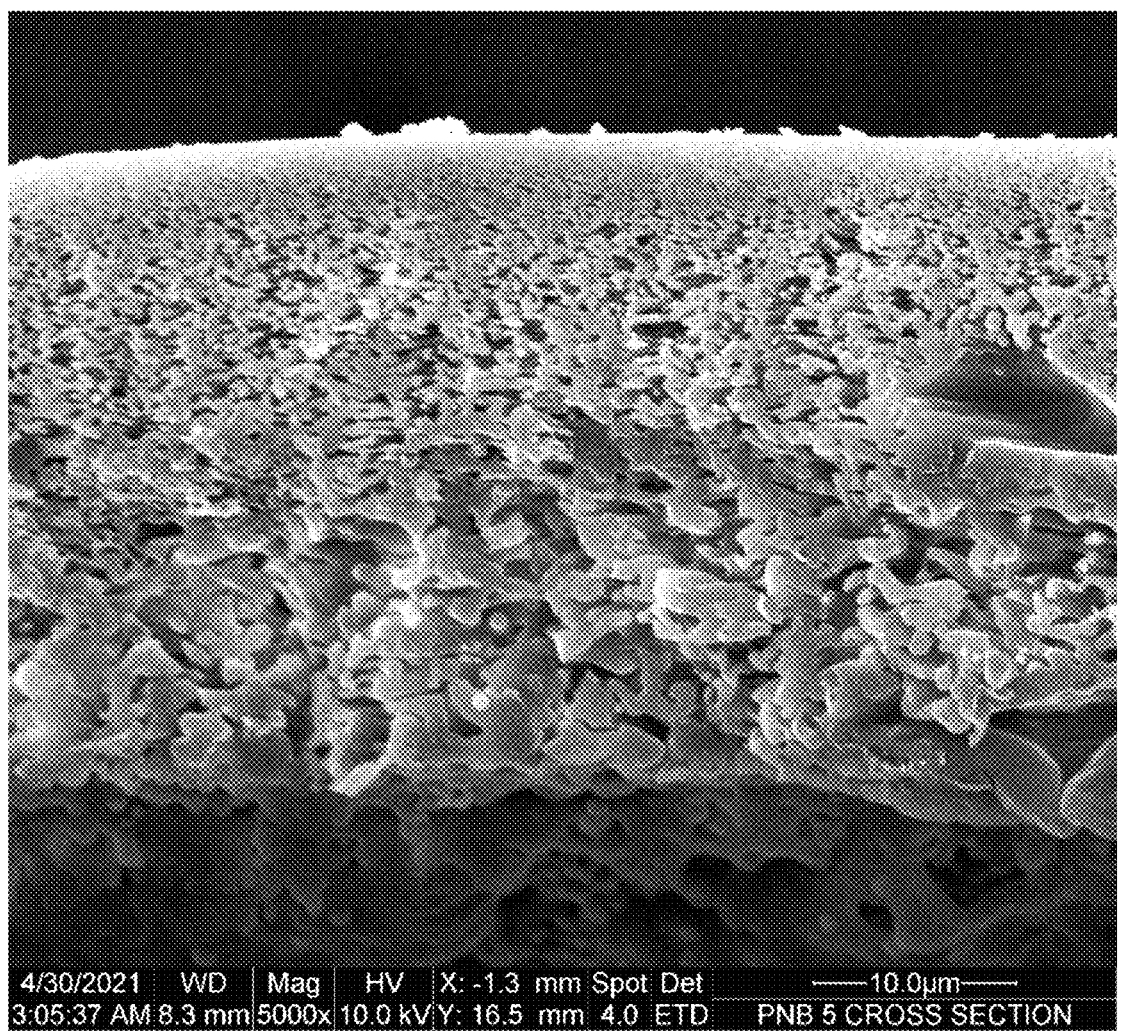

POROUS POLY (CYCLIC OLEFIN) MEMBRANES

CROSS-REFERENCE TO RELATED APPLICATIONS

This application claims the benefit under 35 USC 119 of U.S. Provisional Patent Application No. 63/185,855, filed May 7, 2021, the disclosure of which is hereby incorporated herein by reference in its entirety.

TECHNICAL FIELD

The disclosure relates generally to the field of liquid purification using membrane technology.

BACKGROUND

Filter products are indispensable tools of modern industry, used to remove unwanted materials from a flow of a useful fluid. Useful fluids that are processed using filters include water, liquid industrial solvents and processing fluids, used for manufacturing or processing (e.g., in semiconductor fabrication), and liquids that have medical or pharmaceutical uses. Unwanted materials that are removed from fluids include impurities and contaminants such as particles, microorganisms, and dissolved chemical species. Specific examples of filter applications include their use with liquid materials for semiconductor and microelectronic device manufacturing.

Filters can remove unwanted materials by a variety of different ways, such as by size exclusion or by chemical and/or physical interaction with material. Some filters are defined by a structural material providing a porous architecture to the filter, and the filter is able to trap particles of a size that are not able to pass through the pores. Some filters are defined by the ability of the structural material of the filter, or of a chemistry associated with the structural material, to associate and interact with materials that pass over the filter. For example, chemical features of the filter may enable association with unwanted materials from a stream that passes over or through the filter, trapping those unwanted materials such as by ionic, coordinative, chelation, or hydrogen-bonding interactions. Some filters can utilize both size exclusion and chemical interaction features to remove materials from a filtered stream.

In some cases, to perform a filtration function, a filter includes a filter membrane that is responsible for removing unwanted material from a fluid that passes through. The filter membrane may, as required, be in the form of a flat sheet, which may be wound (e.g., spirally), flat, pleated, or disk-shaped. The filter membrane may alternatively be in the form of a hollow fiber. The filter membrane can be contained within a housing or otherwise supported so that fluid that is being filtered enters through a filter inlet and is required to pass through the filter membrane before passing through a filter outlet.

The removal of ionic materials such as dissolved anions or cations from solutions is important in many industries, such as the microelectronics industry, where ionic contaminants and particles in very small concentrations can adversely affect the quality and performance of microprocessors and memory devices. In particular, it may be desirable to remove metal-containing materials, including metal ions from liquid compositions that are used for device fabrication. Metal-containing materials can be found in different types of liquids that are used for microelectronic manufacturing.

There remain various unresolved technical challenges for the removal of metal-containing materials from fluids. A large range of different types of liquid materials are used as process solvents, cleaning agents, and other processing solutions in microelectronic device processing. Many, if not most of these materials require a very high level of purity. As an example, liquid materials (e.g., solvents) used in photolithography processing of microelectronic devices must be of very high purity. Specific examples of liquids that are used in microelectronic device processing include process solutions for spin-on-glass (SOG) techniques, for bottom anti-reflective coating (BARC) methods, for photolithography, wet chemistry etching methods, and cleaning operations following chemical mechanical polishing, ashing, and etching methods. One option for resolving these technical challenges are new membrane materials.

SUMMARY

In summary, the disclosure provides certain filter membranes comprised of cyclic polyolefin polymers. Despite their relatively high molecular weights and glass transition temperatures (Tg), these polymers are soluble in certain solvents, such as hydrocarbons and cyclic ethers such as tetrahydrofuran (THF). Once in solution, these polymer solutions can be cast into a film and subjected to a nonsolvent-induced phase separation to ultimately provide a porous membrane. Water and certain protic water-miscible organic solvents can be used as nonsolvents (for the polymer) in this membrane formation, either alone or as a combination of nonsolvents. In this regard, the nonsolvent must be miscible with the first solvent. In one embodiment, a norbornene polymer (homopolymer or copolymer) is dissolved in a solvent such as tetrahydrofuran, and then a nonsolvent such as isopropanol is added. The polymer solution is cast into a film over a flat surface, for example a glass plate, and then immersed in water to form a norbornene polymer membrane.

BRIEF DESCRIPTION OF THE DRAWINGS

FIG. 1 is a scanning electron micrograph (SEM) of a filter membrane of the invention prepared from poly(norbornene) at 5000× magnification (See Example 2 below).

DETAILED DESCRIPTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g., 1 to 5 includes 1, 1.5, 2, 2.75, 3, 3.80, 4 and 5).

A filter membrane can be constructed of a porous structure that has average pore sizes that can be selected based on the use of the filter, i.e., the type of filtration performed by the filter. Typical pore sizes are in the micron or sub-micron range, such as from about 0.001 micron to about 10 microns. Membranes with average pore size of from about 0.001 to about 0.05 micron are sometimes classified as ultrafilter membranes. Membranes with pore sizes between about 0.05 and 10 microns are sometimes referred to as microporous membranes.

A filter membrane, or as referred to herein simply as a "membrane", having micron or sub-micron-range pore sizes can be effective to remove an unwanted material from a fluid flow either by a sieving mechanism or a non-sieving mechanism, or by both. A sieving mechanism is a mode of filtration by which a particle is removed from a flow of liquid by mechanical retention of the particle at a surface of a filter membrane, which acts to mechanically interfere with the movement of the particle and retain the particle within the filter, mechanically preventing flow of the particle through the filter. Typically, the particle can be larger than pores of the filter. A "non-sieving" filtration mechanism is a mode of filtration by which a filter membrane retains a suspended particle or dissolved material contained in flow of fluid through the filter membrane in a manner that is not exclusively mechanical, e.g., that includes an electrostatic mechanism by which a particulate or dissolved impurity is electrostatically attracted to and retained at a filter surface and removed from the fluid flow; the particle may be dissolved, or may be solid with a particle size that is smaller than pores of the filter medium.

In certain embodiments of the filter membranes and methods of the present disclosure, the filter includes a porous filter membrane in the form of a polymeric film comprised of certain poly(cyclic olefin)s. As used herein, a "porous filter membrane" is a porous polymeric solid that contains porous (e.g., microporous) interconnecting passages that extend from one surface of the membrane to an opposite surface of the membrane. The passages generally provide tortuous tunnels or paths through which a liquid being filtered must pass.

The filter membranes and methods of the disclosure can also function to prevent any particles (e.g., metal containing particles) present within the liquid composition that are larger than the pores from entering the microporous membrane or can function to trap the particles within the pores of the microporous membrane (i.e., wherein particles are removed by a sieving-type filtration mechanism). The liquid to be treated can pass through the membrane resulting in flow-through having a reduced amount of metals, such as a reduced amount of ionic metal species, a reduced amount of metal-containing particulates, or both.

Accordingly, a porous polymeric membrane of the disclosure can remove metal and metal ion contaminants in a solution that is passing through the membrane, as well as any material that is of a size too large to pass through the pores of the membrane.

Liquid compositions in need of purification can be passed through filter membranes of the disclosure to effectively remove metal contaminants to levels suitable for a desired application. One application which can use the filter materials and methods of the disclosure is semiconductor manufacturing, such as for the purification of metals from solutions that are used for etching and cleaning semiconductor materials. Given the selectivity of their purification capabilities, the filter materials and methods of the disclosure are particularly useful in photolithography in general. Advantageously, the filter membranes and methods of the disclosure are expected to effectively remove undesired amounts of particulate materials, such as metal particulate, and ionic contaminants from such fluids, as well as organic contaminants.

In one embodiment, metal contaminants to be removed using the filter materials and methods of the disclosure include Li, B, Na, Mg, Al, Ca, Ti, V, Cr, Mn, Fe, Ni, Cu, Zn, Mo, Cd, Sn, Ba, and Pb ions, either individually or in combinations of two or more thereof. In one embodiment, the metal ions to be removed are chosen from iron, chromium, manganese, aluminum, and nickel cations.

In a first aspect, the disclosure provides a porous membrane comprising a poly(cyclic olefin) polymer having a thickness of about 40 μm to about 300 μm and a mean pore size of about 5 nm to about 100 nm, wherein the membrane exhibits an isopropanol flow time of greater than about 200 seconds/500 ml when measured at 14.2 psi. The porous membrane may also have a bubble point of about 5 to about 250 psi, when measured using ethoxynonafluorobutane HFE 7200 at a temperature of about 22° C. In one embodiment, the bubble point is about 5 to about 180 psi, when measured using ethoxynonafluorobutane HFE 7200 at a temperature of about 22° C.

The poly(cyclic olefin)s useful in this disclosure include reaction polymerization products of cyclic alkenes. In one embodiment, the poly(cyclic olefin) comprises one or more types of bridged monomeric repeat units, such as repeat units having the structure:

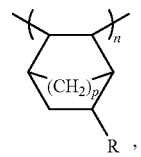

wherein n represents the number of repeat units, p is 0 or 1, and R is chosen from:

(i) a $C_1$-$C_{10}$ alkyl group;

(ii) a $C_1$-$C_{10}$ alkyl group substituted one to three times with a group chosen from halo, nitro, $C_1$-$C_4$ alkoxy, cyano, amine, sulfonamide, sulfonic acid, trifluoromethanesulfonamido, phosphonic acid, carboxyl, hydroxyl, and salts thereof;

(iii) an aryl group, (iv) a carboxyl acid, ester, or amide group, (v) a sulfonic acid group, (vi) a sulfonamide group, (vii) a trifluoromethanesulfonamido group, (viii) an alkoxy group, and (ix) a heteroaryl group.

In one embodiment, salts referred to above are chosen from alkali metal and ammonium salts.

The poly(cyclic olefin)s may be a homopolymer, comprising one repeat unit of the structure shown above, or may be a copolymer, comprising two or more different repeat units having the above structure. For example, the poly(cyclic olefin) may be a copolymer comprising a cyclic olefin repeat unit as shown above, substituted with R, and a cyclic olefin repeat unit not substituted with R, such as norbornene. An example random copolymer has the structure:

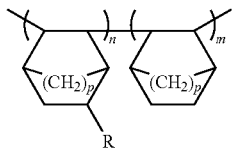

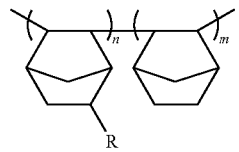

wherein n and m represent the number of repeat units of each type, and n and m may be the same or different. Poly(cyclic olefin)s including both substituted and unsubstituted cyclic olefin repeat units have been found to have improved viscosities, particularly in solvent systems used to provide the porous polymeric membranes.

In certain aspects, the material of the filter membrane can have a chemistry suitable for attachment of a functionality of chelation or ion exchange. This functionality may be introduced via a coating which can be applied to the membrane, such coating possessing suitable functional groups for chelation and/or ion exchange mechanisms for the removal of impurities. Alternatively, the "R" groups of the repeat unit can be altered to contain such a functional group, which can then be available for non-sieving purification mechanisms without the application of a coating or other surface treatment on the membrane, such as a sulfonic acid group or other groups used in ion exchange purification methods. Examples of various methodologies for grafting or otherwise attaching desired functional groups to the polymer membrane surface for the purpose of non-sieving filtration can be found in U.S. Pat. No. 10,792,620, incorporated herein by reference in its entirety, and in U.S. Patent Publication Nos. 2020/0406201; 2020/0254398; 2020/0206691; 2019/0329185; and 2018/0185835, incorporated herein by reference in their entirety.

As used herein, the term "aryl" refers to carbocyclic aromatic rings such as phenyl, napthyl, bi-phenyl, etc. Similarly, the term "heteroaryl" refers to carbocyclic aromatic rings having one or more heteroatoms chosen from sulfur, oxygen, or nitrogen. Examples of heteroaryl groups include pyridyl, pyrimidyl, furyl, thienyl, pyrrolyl, benzofuryl, and benzothienyl groups. The aryl and heteroaryl groups may be substituted one or more times with groups such as $C_1$-$C_6$ alkyl, $C_1$-$C_6$ alkoxy, cyano, halo, sulfonamido, sulfonic acid, phosphonic acid, carboxyl, and hydroxyl groups, and alkali metal and ammonium salts thereof.

In another embodiment, the poly(cyclic olefin) is a poly(norbornene) polymer, i.e., a homopolymer or copolymer comprising a repeat unit having the structure:

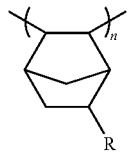

wherein R is hydrogen or a $C_1$-$C_{10}$ alkyl. For example, the poly(cyclic olefin) may be a homopolymer, comprising only repeat units in which R is hydrogen or comprising only repeat units in which R is a $C_1$-$C_{10}$ alkyl. Alternatively, the poly(cyclic olefin) may be a copolymer comprising a combination of these repeat units, such as a copolymer having the structure:

wherein n and m represent the number of repeat units, and n and m are the same or different. Some poly(norbornene) homopolymers are available commercially and their synthesis is known. For example, poly(norbornene) can be obtained via the Diels-Alder reaction of cyclopentadiene with ethylene. Thus, derivatization of the R group above may be achieved by variation of the corresponding R group on the starting material.

Accordingly, in one embodiment, the disclosure provides a porous membrane comprising a poly(norbornene) polymer, having a thickness of about 40 μm to about 300 μm and a mean pore size of about 10 nm to about 100 nm, wherein the membrane exhibits an isopropanol flow time of about 200 seconds/500 ml to about 8000 seconds/500 ml when measured at 14.2 psi. The porous membrane may also have a bubble point of about 5 to about 250 psi, when measured using ethoxynonafluorobutane HFE 7200 at a temperature of about 22° C. In one embodiment, the bubble point is about 5 to about 180 psi, when measured using ethoxynonafluorobutane HFE 7200 at a temperature of about 22° C.

As noted above, the membranes of the invention may be prepared by an immersion casting process. In this process, the poly(cyclic olefin) is dissolved in a water-miscible solvent. Suitable solvents for a particular poly(cyclic olefin) for this purpose can either be determined using the Hansen Solubility Parameters analysis or can be determined empirically, by trial and error. In certain embodiments, such solvents include water miscible cyclic ether solvents, such as tetrahydrofuran, dioxane, or tetrahydropyran. Polymer non-solvents are another class of materials that are commonly added to the polymer solution to change its phase separation behaviour and result in a desired membrane morphology. Liquids such as water and certain water-miscible organic materials can be used as nonsolvents in this membrane formation, alone, as a combination of nonsolvents, or utilized sequentially. Once in solution, these polymer solutions can be cast into a film and immersed into a nonsolvent/coagulant to induce phase separation and form the porous asymmetric membranes of the disclosure.

In one embodiment, the water-miscible materials (i.e., nonsolvents) include $C_1$-$C_{10}$ alkanols, such as methanol, ethanol, n-propanol, isopropanol, n-butanol, sec-butanol, tert-butanol, and the like. Additionally, the non-solvent can be chosen from glycols and glycol ethers, $C_2$-$C_{10}$ diols and $C_2$-$C_{10}$ triols, tetrahydrofurfuryl alcohol, ethyl benzoate, acetonitrile, acetone, ethylene glycol, propylene glycol, 1,3-propanediol, dioxane, butyryl lactone, butylene carbonate, ethylene carbonate, propylene carbonate, dipropylene glycol, diethylene glycol monomethyl ether, triethylene glycol monomethyl ether, diethylene glycol monoethyl ether, triethylene glycol monoethyl ether, ethylene glycol monopropyl ether, ethylene glycol monobutyl ether, diethylene glycol monobutyl ether, triethylene glycol monobutyl ether, ethylene glycol monohexyl ether, diethylene glycol monohexyl ether, ethylene glycol phenyl ether, propylene glycol methyl ether, dipropylene glycol methyl ether, tripropylene glycol methyl ether, dipropylene glycol dimethyl ether, dipropylene glycol ethyl ether, propylene glycol n-propyl ether, dipropylene glycol n-propyl ether, tripropylene glycol n-propyl ether, propylene glycol n-butyl ether, dipropylene glycol n-butyl ether, tripropylene glycol n-butyl ether, propylene glycol phenyl ether, ethylene glycol monophenyl ether, diethylene glycol monophenyl ether hexaethylene glycol monophenylether, dipropylene glycol methyl ether acetate, tetraethylene glycol dimethyl ether dibasic ester, glycerine carbonate, N-formyl morpholine, triethyl phosphate, and combinations thereof.

The addition of the nonsolvent(s) form the membrane (i.e., a porous film) morphology having the desired microstructure, in terms of porosity, average pore size as well as pore size distribution. The desired morphology is thus provided via choice of nonsolvent(s), concentration, temperature, etc. In one embodiment, a poly(norbornene) polymer is dissolved in tetrahydrofuran, blended with isopropanol, cast into a film and then immersed in water to induce phase separation and formation of a porous filter membrane (i.e., film).

Thus, in a further aspect, the disclosure provides a porous membrane comprising a poly(norbornene) homopolymer or copolymer, having a thickness of about 40 µm to about 300 µm and a mean pore size of about 5 nm to about 100 nm, wherein the membrane exhibits an isopropanol flow time of about 200 seconds/500 ml to about 8000 seconds/500 ml when measured at 14.2 psi. The porous membrane may also have an initial bubble point of about 5 to about 250 psi, when measured using ethoxynonafluorobutane HFE 7200 at a temperature of about 22° C. This porous membrane is prepared by dissolving the polymer in a water-miscible solvent to form a solution, followed by addition of at least one first nonsolvent, followed by casting of the solution over a flat surface, thereby forming a coated surface, and followed by immersion of the coated surface in at least one second nonsolvent, thereby effecting formation of the porous membrane.

In one embodiment, the bubble point is about 5 to about 180 psi, when measured using ethoxynonafluorobutane HFE 7200 at a temperature of about 22° C.

In one embodiment, the first nonsolvent is isopropanol and the second nonsolvent is water.

In another embodiment, the solution of the poly(cyclic olefin) may be subjected to filtration through an ion exchange resin or membrane in order to remove trace amounts of metal ions which may be entrained within the starting poly(cyclic olefin) starting material. For example, a tetrahydrofuran solution of poly(norbornene) may be passed through an ion exchange membrane or column containing ion exchange resin beads to remove trace amounts of metal ions prior to the formation of the membranes of the disclosure.

As used herein, a "filter," refers to an article having a structure that includes a filter membrane.

In some embodiments, the filter of the disclosure includes a composite filter arrangement. For example, a filter with a composite arrangement can include two or more filter materials, such as two or more filter articles. For example, the filter can include a first porous polymeric membrane that includes the membrane(s) of the present disclosure, and a second filter material that does not include the membrane(s) of the present disclosure, or that is in some way different from the membrane(s) of the present disclosure. The second filter material can also be in the form of a porous membrane, or can be different, such as having a non-porous form, or other filter material, such as a woven or nonwoven material. The second filter material can be made of the same or of a different polymeric material than the first membrane.

Accordingly, in another embodiment the disclosure provides a composite filter comprising:
  a first filter material and a second filter material, an output facing surface of the first filter material in contact with an input facing surface of the second filter material,
  wherein the first filter material comprises the membrane of the disclosure as set forth herein;
  and wherein the second filter material is different from the first filter material.

As noted above, the filter membranes can be used to remove particulate materials (such as metal particles), metal ions, and organic contaminants from an organic solvent. Some specific, non-limiting, examples of solvents used in photolithograpy which can be filtered using a filter membrane as described include: n-butyl acetate (nBA), isopropyl alcohol (IPA), 2-ethoxyethyl acetate (2EEA), cyclohexanone, ethyl lactate, gamma butyro lactone, isopentyl ether, methyl-2-hydroxyisobutyrate, methyl isobutyl carbinol (MIBC), methyl isobutyl ketone (MIBK), isoamyl acetate, propylene glycol methyl ether (PGME), propylene glycol monomethyl ether acetate (PGMEA), and a mixed solution of propylene glycol monomethyl ether (PGME) and PGMEA (7:3 mixing ratio surface tension of 27.7 mN/m). Since the porous membranes comprising a poly(cyclic olefin), particularly the porous membranes comprising a poly(norbornene) homopolymer of copolymer is hydrophobic and is essentially non-reactive, these membranes can be particularly useful for removing impurities from highly reactive solvents, which would include aqueous acids (e.g., hydrochloric acid), aqueous bases, (e.g., aqueous ammonia), peroxy compounds such as hydrogen peroxide, and the like.

For example, in some modes of practice, a solvent may be obtained having an amount of metal ion and/or metal containing impurities (i.e., particulates) that are higher than desired for a target application, such as cleaning solvents, or solvents for resist stripping applications in lithography, for formation of an integrated circuit. For example, the metal impurities can be present in total amounts at ppm or ppb levels in the solvent. The solvent is then passed through the filter membranes of the disclosure to remove metal contaminants and to provide a filtered solvent having an amount of metals that is lower than the amount of metals in the starting solvent. In certain modes of practice the filter of the disclosure can remove an amount of about 25% (wt) or greater, about 30% (wt) or greater, about 35% (wt) or greater, about 40% (wt) or greater, about 45% (wt) or greater, about 50% (wt) or greater, about 55% (wt) or greater, about 60% (wt) or greater, about 65% (wt) or greater, about 70% (wt) or greater, about 75% (wt) or greater, about 80% (wt) or greater, about 85% (wt) or greater, about 90% (wt) or greater, or about 95% (wt) or greater, any one or more metals from the starting solvent.

The solvents that are treated to remove metal contaminants can be passed through the filters under desired conditions, such as those that enhance removal of metal contaminant from the fluid stream. In some modes of practice, the solvent is passed through the filter at a temperature of about 120° C. or less, 80° C. or less, or 40° C. or less.

The passage of solvent through the filter membranes of the disclosure is not limited to any particular flow rate.

Referring to the porous polymeric filter membranes as described herein, such membranes can be characterized by physical features that include pore size, bubble point, and porosity. In this regard, the porous polymeric filter membrane may have any pore size that will allow the filter membrane to be effective for performing as a filter membrane, e.g., as described herein, including pores of a size (average pore size) sometimes considered as a microporous filter membrane or an ultrafilter membrane. In certain embodiments, the porous membranes can have an average pore size in a range on from about 5 nm to about 100 nm, with the pore size to be selected based on one or more factors that include: the particle size or type of impurity to be removed, pressure and pressure drop requirements, and viscosity requirements of a liquid being processed by the filter. Pore size is often reported as average pore size of a porous material, which can be measured by known techniques such as by Mercury Porosimetry (MP), Scanning Electron Microscopy (SEM), Liquid Displacement (LLDP), or Atomic Force Microscopy (AFM).

Bubble point is also a known feature of a porous membrane. By a bubble point test method, a sample of porous polymeric filter membrane is immersed in and wetted with a liquid having a known surface tension, and a gas pressure is applied to one side of the sample. The gas pressure is gradually increased. The minimum pressure at which the gas flows through the sample is called a bubble point. To determine the bubble point of a porous material a sample of the porous material is immersed in and wetted with ethoxy-nonafluorobutane HFE 7200 (available from 3M) at a temperature of 20-25° C. (e.g., 22° C.). A gas pressure is applied to one side of the sample by using compressed air and the gas pressure is gradually increased. When the membrane is asymmetric, the gas pressure is applied to the side of the membrane sample having the larger pore size. All bubble point values provided herein are measured using the procedure described above and are initial bubble points. Examples of useful bubble points of a porous polymeric filter membrane that is useful or preferred according to the present description, measured using the procedure described above can be in a range from about 5 to about 250 psi, about 5 to about 225 psi, about 5 to about 200 psi, about 5 to about 180 psi, about 5 to about 150 psi, about 30 to about 250 psi, about 30 to about 225 psi, about 30 to about 200 psi, about 30 to about 180 psi, about 30 to about 150 psi, about 50 to about 250 psi, about 50 to about 225 psi, about 50 to about 200 psi, about 50 to about 180 psi, and all ranges and subranges therebetween. A porous polymer filter layer as described may have any porosity that will allow the porous polymer filter layer to be effective as described herein. Example porous polymer filter layers can have a relatively high porosity, for example a porosity of at least 60, 70 or 80 percent. As used herein, and in the art of porous bodies, a "porosity" of a porous body (also sometimes referred to as void fraction) is a measure of the void (i.e., "empty") space in the body as a percent of the total volume of the body, and is calculated as a fraction of the volume of voids of the body over the total volume of the body. A body that has zero percent porosity is completely solid.

Advantageously, the bubble point and IPA flow time (affected by pore size and interconnectivity, i.e., morphology) balance are optimized for desired overall performance.

A porous polymeric filter membrane as described can be in the form of a sheet or hollow fiber having any useful thickness, e.g., a thickness in a range from about 40 µm to about 300 µm, about 80 µm to about 250 µm, or about 120 µm to about 200 µm, about 140 µm to 180 µm, and all ranges or subranges therebetween.

In certain embodiments, the membranes of the disclosure are asymmetric, wherein one surface of the membrane has larger pore sizes than an opposite surface of the membrane.

Membrane isopropanol (IPA) flow times as reported herein are determined by measuring the time it takes for 500 ml of isopropyl alcohol (IPA) fluid to pass through a membrane with a 47 mm membrane disc with an effective surface area of 13.8 cm$^2$, at 14.2 psi, and at a temperature of 21° C. Water flow time can be measured using the same procedure as IPA flow time except water is used instead of IPA. In some embodiments the isopropanol flow time is greater than about 200 seconds/500 mL. In other embodiments, the isopropanol flow time is greater than about 200 seconds/500 mL and below about 50,000 seconds/500 mL, greater than about 200 seconds/500 mL and below about 20,000 seconds/500 mL, greater than about 200 seconds/500 mL and below about 15,000 seconds/500 mL, greater than about 200 seconds/500 mL and below about 8,000 seconds/500 mL, greater than about 200 seconds/500 mL and below about 1,000 seconds/500 mL, greater than about 500 seconds/500 mL and below about 50,000 seconds/500 mL, greater than about 500 seconds/500 mL and below about 20,000 seconds/500 mL, greater than about 500 seconds/500 mL and below about 15,000 seconds/500 mL, greater than about 200 seconds/500 mL and below about 8,000 seconds/500 mL, greater than about 500 seconds/500 mL and below about 1,000 seconds/500 mL, greater than about 1,000 seconds/500 mL and below about 50,000 seconds/500 mL, greater than about 1,000 seconds/500 mL and below about 20,000 seconds/500 mL, greater than about 1,000 seconds/500 mL and below about 15,000 seconds/500 mL, than about 200 seconds/500 mL and below about 8,000 seconds/500 mL, and any ranges and subranges therebetween.

A filter membrane as described can be contained within a larger filter structure such as a multilayer filter assembly or a filter cartridge that is used in a filtering system. The filtering system will place the filter membrane, e.g., as part of a multi-layer filter assembly or as part of a filter cartridge, in a filter housing to expose the filter membrane to a flow path of a liquid chemical to cause at least a portion of the flow of the liquid chemical to pass through the filter membrane, so that the filter membrane removes an amount of the impurities or contaminants from the liquid chemical. The structure of a multi-layer filter assembly or filter cartridge may include one or more of various additional materials and structures that support the filter membrane within the filter assembly or filter cartridge to cause fluid to flow from a filter inlet, through the membrane (including the filter layer), and thorough a filter outlet, thereby passing through the filter membrane when passing through the filter. The filter membrane supported by the filter assembly or filter cartridge can be in any useful shape, e.g., a pleated cylinder, a cylindrical pad, one or more non-pleated (flat) cylindrical sheets, a pleated sheet, among others.

In addition, a filter membrane as described can be characterized by membrane flux, which is defined as the volumetric flow of a liquid going through the unit area of the membrane at a certain pressure. The membrane flux must be sufficiently high so that a membrane filter device having certain membrane area can deliver the required flow rate of the liquid for a certain application. The flow characteristic of a membrane can also be measured by membrane flow-time which can be considered as membrane resistance toward the liquid flow and is defined as the time required for the flow of 500 ml of liquid through a 47 mm disc membrane with an effective surface area of 13.8 cm$^2$ at a pressure of 14.2 psi, at 21° C. A filter membrane as described herein can in certain embodiments have a relatively low flow time, for example in combination with a bubble point that is relatively high, and exhibit good filtering performance (e.g., as measured by particle retention).

In a further aspect, the disclosure provides a method of removing one or more particulate materials, and/or metal ions, and/or organic contaminants from a liquid composition, said liquid composition comprising at least one particulate material, and/or metal ion, and/or organic contaminant, the method comprising:
(i) passing the liquid composition, through the membrane of the disclosure, and
(ii) reducing an amount of the one or more particulate materials, and/or metal ions, and/or organic contaminants in the liquid composition, thereby providing a purified liquid composition.

EXAMPLES

Example 1

A 5 g sample of a poly(norbornene) PNB polymer in powder form was added to 50 g of tetrahydrofuran (THF) solvent under stirring by an overhead stirrer. After the polymer was fully dissolved, 6.5 g of isopropanol (IPA) was added to the solution as a nonsolvent. PNB membranes were made by casting a thin film of the polymer solution with a thickness of around 200 microns on a glass and subsequently immersing it into a bath of water at room temperature. The water flow-time and bubble point of the formed membrane were measured according to the procedures described above. The formed membrane showed a wet membrane water flow-time of 1700 sec/500 ml and a bubble point of 22 psi.

Example 2

5 g of a PNB polymer in powder form was added to 50 g of THF solvent under stirring by an overhead stirrer. After the polymer was fully dissolved, 5-6.5 g of IPA was added to the solution as a nonsolvent. PNB membranes were made by casting a thin film of the polymer solution with a thickness of around 200 microns on a glass and subsequently immersing it into a bath of water at room temperature. The formed membrane was dried at room temperature for 24 hrs. Then the membrane the IPA flow time and bubble point were measured according to the procedures described above, with the result of IPA flow-time and bubble point shown in the table below.

| Material Ratio | IPA flow time | Initial BP | ASTM average BP |
| --- | --- | --- | --- |
| *PNB/THF/IPA = 5/50/6.5 | 1775 sec/500 ml | 12.6 Psi | 51.7 Psi |
| *PNB/THF/IPA = 5/50/5 | 5890 sec/500 ml | 16.4 Psi | 85.9 Psi |

*poly(norbornene)/tetrahydrofuran/isopropanol in weight proportions for two membranes Example 3

Two poly(cyclic olefin)(PCO) copolymers were prepared having the structure:

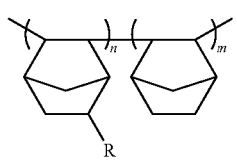

wherein R is hexyl. For Copolymer A, n=92 and m=8 while, for Copolymer B, n=80 and m=20. In addition, a poly(cyclic olefin) homopolymer was prepared, where n=100 and m=0.

Polymer solutions comprising Copolymer A, Copolymer B, and the homopolymer were prepared using the procedure described in Example 1. The material ratios of each are shown in the table below.

PNB membranes were made by casting a thin film of these polymer solutions with a thickness of around 200 microns on a glass and subsequently immersing it into a bath of water at room temperature. The IPA flow-time and bubble point of the formed membranes were measured according to the procedures described above, and the results are shown in the table below.

| Polymer | PCO/THF/IPA | IPA flow time (sec/500 L) | Initial BP (psi) | ASTM Average BP (psi) |
| --- | --- | --- | --- | --- |
| Homopolymer | 5/44/6.5 | 3600 | 30 | 67 |
| Copolymer A | 5/44/6.5 | 1900 | 27 | 60 |
| Copolymer B | 5/44/6.5 | 2600 | 21 | 46 |

Aspects

In a first aspect, the disclosure provides a porous membrane comprising:
a poly(cyclic olefin) polymer having a thickness of about 40 μm to about 300 μm and a mean pore size of about 5 nm to about 100 nm,
wherein the membrane exhibits an isopropanol flow time of greater than about 200 seconds/500 ml when measured at 14.2 psi and at a temperature of about 21° C.

In a second aspect, the disclosure provides the membrane of the first aspect, wherein the membrane has a bubble point of about 5 to about 250 psi, when measured using ethoxynonafluorobutane HFE 7200 at a temperature of about 22° C.

In a third aspect, the disclosure provides the membrane of the first or second aspects, wherein the poly(cyclic olefin) comprises a bridged monomer repeat unit.

In a fourth aspect, the disclosure provides the membrane of any of the first through third aspects, wherein the poly(cyclic olefin) is a polymer having the partial structure:

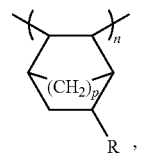

wherein n represents the number of repeat units, p is 0 or 1, and R is chosen from:
(i) a $C_1$-$C_{10}$ alkyl group;
(ii) a $C_1$-$C_{10}$ alkyl group substituted one to three times with a group chosen from halo, nitro, $C_1$-$C_4$ alkoxy, cyano, amine, sulfonamide, sulfonic acid, trifluoromethanesulfonamido, phosphonic acid, carboxyl, hydroxyl, and salts thereof;
(iii) an aryl group,
(iv) a carboxylic acid, ester, or amide group,
(v) a sulfonic acid group,
(vi) a sulfonamide group,
(vii) a trifluoromethanesulfonamido group,
(viii) an alkoxy group, and
(ix) a heteroaryl group.

In a fifth aspect, the disclosure provides a porous membrane of any of the first through fourth aspects wherein the poly(cyclic olefin) polymer is a poly(norbornene) homopolymer or copolymer.

In a sixth aspect, the disclosure provides a porous membrane of any of the first through fifth aspects, wherein the membrane exhibits an isopropanol flow time in a range from about 200 second/500 ml to about 50,000 seconds/500 ml when measured at 14.2 psi and at a temperature of about 21° C.

In a seventh aspect, the disclosure provides a porous membrane of any of the first through sixth aspects, wherein the membrane exhibits an isopropanol flow time in a range from about 200 second/500 ml to about 8,000 seconds/500 ml when measured at 14.2 psi and at a temperature of about 21° C.

In an eighth aspect, the disclosure provides a porous membrane of any of the first through seventh aspects, wherein the membrane has an initial bubble point of about 5 to about 180 psi, when measured using ethoxynonafluorobutane HFE 7200 at a temperature of about 22° C.

In a ninth aspect, the disclosure provides a porous membrane comprising: a poly(cyclic olefin) polymer having a thickness of about 40 µm to about 300 µm, wherein the membrane exhibits an isopropanol flow time of greater than about 200 seconds/500 ml when measured at 14.2 psi and at a temperature of about 21° C., and wherein the membrane has a bubble point of about 5 to about 250 psi, when measured using ethoxynonafluorobutane HFE 7200 at a temperature of about 22° C.

In a tenth aspect, the disclosure provides a porous membrane of any of the first through ninth aspects, wherein the membrane is prepared by dissolving the polymer in a water-miscible solvent to form a solution, followed by addition of at least one first nonsolvent, followed by casting the solution over a flat surface thereby forming a coated surface, and followed by immersion of the coated surface in at least one second nonsolvent thereby effecting formation of the porous membrane.

In an eleventh aspect, the disclosure provides a porous membrane of the tenth aspect, further comprising purifying the solution by filtration through an ion-exchange resin or membrane thereby removing trace metal ion contaminants, prior to casting the solution over a flat surface.

In a twelfth aspect, the disclosure provides a porous membrane of the tenth or eleventh aspect, wherein the first nonpolar solvent comprises isopropanol.

In a thirteenth aspect, the disclosure provides a porous membrane of any of the tenth through twelfth aspects, wherein the second nonsolvent comprises water.

In a fourteenth aspect, the disclosure provides a porous membrane of any of the tenth through thirteenth aspects, wherein the water-miscible solvent comprises tetrahydrofuran.

In a fifteenth aspect, the disclosure provides a porous membrane of any of the tenth through fourteenth aspects, wherein the poly(cyclic olefin) polymer is a poly(norbornene) polymer.

In a sixteenth aspect, the disclosure provides a porous membrane of the fifteenth aspect, wherein the poly(norbornene) polymer is a norbornene homopolymer.

In a seventeenth aspect, the disclosure provides a porous membrane of the fifteenth aspect, wherein the poly(norbornene) polymer is a norbornene copolymer.

In an eighteenth aspect, the disclosure provides a method of removing one or more contaminants from a liquid composition, said liquid composition comprising at least one particulate material, metal ion, organic contaminant or combinations thereof, the method comprising: passing the liquid composition, through the porous membrane of any of the first through seventeenth aspects, and reducing an amount of the contaminants in the liquid composition, thereby providing a purified liquid composition.

In a nineteenth aspect, the disclosure provides a method of the eighteenth aspect, wherein the particulate material comprises one or more metal particulates.

In a twentieth aspect, the disclosure provides a method of the eighteenth or nineteenth aspect, wherein the liquid is a liquid used in semiconductor device manufacturing.

In a twenty-first aspect, the disclosure provides a filter comprising the porous membrane of any one of the first through seventeenth aspects.

In a twenty-second aspect, the disclosure provides a composite filter comprising: a first filter material and a second filter material, an output facing surface of the first filter material in contact with an input facing surface of the second filter material, wherein the first filter material comprises the porous membrane of any one of the first through seventeenth aspects, and wherein the second filter material is different from the first filter material.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. The disclosure's scope is, of course, defined in the language in which the appended claims are expressed.

What is claimed is:

1. A porous membrane comprising:
a poly (cyclic olefin) copolymer according to:

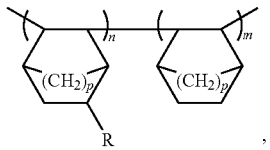

wherein n and m represent the number of repeat units of each type, p is 0 or 1, and R is chosen from:
(i) a $C_1$-$C_{10}$ alkyl group; and
(ii) a $C_1$-$C_{10}$ alkyl group substituted one to three times with a group chosen from halo, nitro, $C_1$-$C_4$ alkoxy, cyano, amine, sulfonamide, sulfonic acid, trifluoromethanesulfonamido, phosphonic acid, carboxyl, hydroxyl, and salts thereof;
the porous membrane having a thickness of about 40 µm to about 300 µm and a mean pore size of about 10 nm to about 100 nm, and
wherein the porous membrane exhibits an isopropanol flow time in a range from about 200 seconds/500 ml to about 50,000 seconds/500 ml when measured at 14.2 psi and at a temperature of about 21° C.

2. The porous membrane of claim 1, wherein the porous membrane has a bubble point of about 5 psi to about 250 psi, when measured using ethoxynonafluorobutane HFE 7200 at a temperature of about 22° C.

3. The porous membrane of claim 1, wherein the porous membrane exhibits an isopropanol flow time in a range from about 200 second/500 ml to about 8,000 seconds/500 ml when measured at 14.2 psi and at a temperature of about 21° C.

4. The porous membrane of claim 1, wherein the porous membrane has a bubble point of about 5 psi to about 180 psi, when measured using ethoxynonafluorobutane HFE 7200 at a temperature of about 22° C.

5. The porous membrane of claim 1 wherein R is a $C_1$-$C_{10}$ alkyl group.

6. A porous membrane comprising:
a poly (cyclic olefin) copolymer according to:

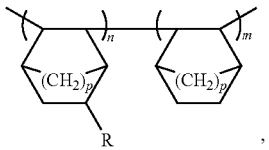

wherein n and m represent the number of repeat units of each type, p is 0 or 1, and R is chosen from:
(i) a $C_1$-$C_{10}$ alkyl group;
(ii) a $C_1$-$C_{10}$ alkyl group substituted one to three times with a group chosen from halo, nitro, C1-C4 alkoxy, cyano, amine, sulfonamide, sulfonic acid, trifluoromethanesulfonamido, phosphonic acid, carboxyl, hydroxyl, and salts thereof;
the porous membrane having a thickness of about 40 μm to about 300 μm,
wherein the porous membrane exhibits an isopropanol flow time in a range from about 200 seconds/500 ml to about 50,000 seconds/500 ml when measured at 14.2 psi and at a temperature of about 21° C., and wherein the porous membrane has a bubble point of about 5 psi to about 250 psi, when measured using ethoxynonafluorobutane HFE 7200 at a temperature of about 22° C.

7. The porous membrane of claim 6, wherein the porous membrane exhibits an isopropanol flow time in a range from about 200 second/500 ml to about 8,000 seconds/500 ml when measured at 14.2 psi and at a temperature of about 21° C.

8. The porous membrane of claim 6, wherein the porous membrane has a bubble point of about 5 psi to about 180 psi, when measured using ethoxynonafluorobutane HFE 7200 at a temperature of about 22° C.

9. The porous membrane of claim 6 wherein R is a $C_1$-$C_{10}$ alkyl group.

10. The porous membrane of claim 6, wherein the porous membrane has a bubble point of about 5 psi to about 180 psi, when measured using ethoxynonafluorobutane HFE 7200 at a temperature of about 22° C.

11. A composite filter comprising:
a first filter material and a second filter material, an output facing surface of the first filter material in contact with an input facing surface of the second filter material,
wherein the first filter material comprises the porous membrane of claim 1, and wherein the second filter material is different from the first filter material.

12. A composite filter comprising:
a first filter material and a second filter material, an output facing surface of the first filter material in contact with an input facing surface of the second filter material,
wherein the first filter material comprises the porous membrane of claim 6, and wherein the second filter material is different from the first filter material.

* * * * *